United States Patent [19]
Kimmig et al.

[11] Patent Number: 5,803,224
[45] Date of Patent: Sep. 8, 1998

[54] FRICTION CLUTCH

[75] Inventors: Karl-Ludwig Kimmig, Bühl-Waldmatt; Rolf Meinhard, Buhl; Irene Fallert, Sasbachwalden, all of Germany

[73] Assignee: LuK Lamellen und Kupplungsbau GmbH, Bühl/Baden, Germany

[21] Appl. No.: 811,429

[22] Filed: Mar. 3, 1997

[30] Foreign Application Priority Data

Mar. 5, 1996 [DE] Germany .................. 196 08 454.7

[51] Int. Cl.⁶ .................................................. F16D 13/75
[52] U.S. Cl. ................................... 192/70.25; 192/111 A; 192/109 R
[58] Field of Search ........................... 192/70.25, 111 A, 192/113.26, 109 R

[56] References Cited

U.S. PATENT DOCUMENTS

| | | | |
|---|---|---|---|
| 5,450,934 | 9/1995 | Maucher | 192/70.25 |
| 5,509,518 | 4/1996 | Zelikov | 192/111 A X |
| 5,628,389 | 5/1997 | Wittmann et al. | 192/70.25 |
| 5,641,048 | 6/1997 | Von Gaisberg | 192/70.25 |

FOREIGN PATENT DOCUMENTS

| | | |
|---|---|---|
| 42 39 289 A 1 | 5/1993 | Germany . |
| 42 39 291 A 1 | 5/1993 | Germany . |
| 43 06 505 A 1 | 9/1993 | Germany . |
| 43 22 677 A 1 | 1/1994 | Germany . |
| 43 42 390 A 1 | 6/1994 | Germany . |
| 44 18 026 A 1 | 12/1994 | Germany . |

*Primary Examiner*—Rodney H. Bonck
*Attorney, Agent, or Firm*—Darby & Darby

[57] ABSTRACT

A friction clutch wherein the pressure plate is movable axially of and relative to the clutch housing to engage or disengage the clutch by bearing against or by becoming disengaged from the friction linings of the clutch disc. The wear upon the friction linings is compensated for by an adjusting unit which is designed to shift a seat for the titable diaphragm spring relative to the housing and toward the pressure plate. A resilient component, which can form part of or can be borne by the diaphragm spring or which is carried by the housing, acts upon the diaphragm spring to ensure that the magnitude of the force to be exerted upon and by the diaphragm spring during and immediately after disengagement of the clutch varies within a narrow range. The resilient component does not affect the operation of the adjusting unit.

26 Claims, 4 Drawing Sheets

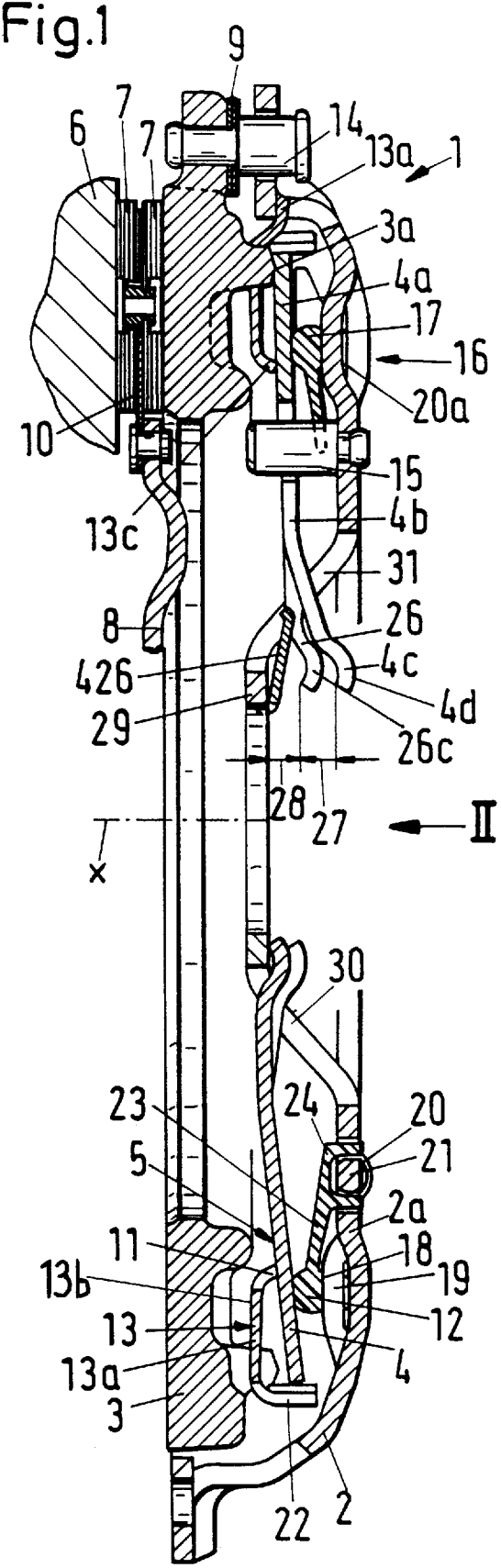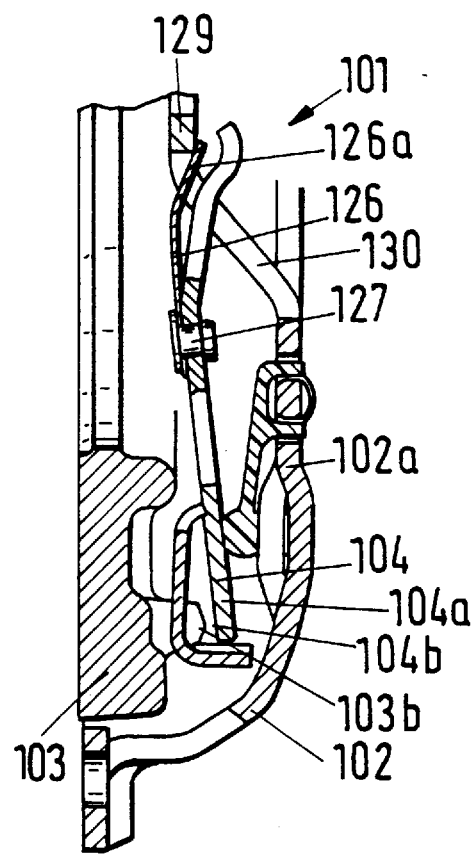

FRICTION CLUTCH

BACKGROUND OF THE INVENTION

The invention relates to friction clutches in general, and more particularly to improvements in friction clutches which employ or which cooperate with so-called clutch plates or clutch discs having friction linings which can be clamped between an axially movable rotary pressure plate and a driven counterpressure plate (such as a flywheel) so that the thus engaged clutch can transmit torque between the clutch disc and a prime mover for the counterpressure plate. Still more particularly, the invention relates to improvements in friction clutches which are equipped or which cooperate with adjusting units designed to compensate for wear at least upon the friction linings of the clutch disc. Such adjusting units are disclosed, for example, in published German patent applications Nos. 42 39 291, 43 06 505, 42 43 289, 43 42 390 and 43 22 677 to which reference may be had if necessary. Additional friction clutches with wear compensating units are disclosed in commonly owned U.S. Pat. No. 5,450,934 the disclosure of which is incorporated herein by reference.

When a friction clutch of the above outlined character is engaged, the pressure plate is caused to bear against the adjacent friction linings of the clutch disc with a considerable force. On the other hand, it is desirable to design the friction clutch in such a way that a relatively small force is required to disengage the pressure plate from the friction linings and that this relatively small disengaging force remains at least substantially unchanged during the entire useful life of the clutch (such useful life is determined, at least to a large degree, by the extent of wear upon the friction linings of the clutch disc). As a rule, the magnitude of such disengaging force should remain within a relatively narrow range of tolerances during the life span of the friction clutch. Pronounced fluctuations of the magnitude of disengaging force are undesirable for a number of reasons; for example, the operator of a motor vehicle which is equipped with a foot-operated friction clutch should encounter a preferably unchanging resistance to depression of the clutch pedal irrespective of the extent of wear upon the friction linings of the clutch disc. This enables the operator of the vehicle to actuate the clutch pedal with a required degree of reliability and predictability.

As a rule, the means for biasing the pressure plate against the friction linings of the clutch disc comprises or constitutes a diaphragm spring. In order to ensure that the diaphragm spring will bias the pressure plate with a pronounced force when the friction clutch is fully engaged but that the disengagement of the clutch will involve the application of a relatively small and at least substantially constant force, the diaphragm spring must be designed and installed in such a way that its characteristic curve exhibits a pronounced drop in that region which is relevant during disengagement of the clutch. Furthermore, and in addition to being required to ensure a disengagement of the clutch in response to the exertion of a relatively small force to the clutch pedal, the diaphragm spring should be designed to establish the possibility of at least some slight additional axial movement of the pressure plate when the disengaging operation is completed in order to account for eventual tolerances in the making and/or in the assembly of the friction clutch. It has been found that presently known friction clutches which employ diaphragm springs and are equipped with means for compensating for wear at least upon the friction linings of the clutch disc do not satisfy all of the above-enumerated requirements. One of the main reasons for such failure of heretofore known friction clutches to satisfy all of the above outlined requirements regarding the magnitude of the disengaging force is that, though the characteristic curve of the diaphragm spring exhibits a pronounced downward slope during actual disengagement of the clutch, the curve exhibits an immediately following pronounced upward slope, i.e., the clutch disengaging force is relatively low during an initial stage of disengagement but becomes rather pronounced or even very pronounced during the next-following stage. This can be a cause of discomfort to the occupant or occupants of a motor vehicle having a power train which embodies a friction clutch of the above outlined character.

OBJECTS OF THE INVENTION

An object of the instant invention is to provide a friction clutch wherein the progress of the disengaging force is more satisfactory than in heretofore known friction clutches which are equipped with means for compensation of wear at least upon the friction linings of the clutch disc.

Another object of the invention is to provide a friction clutch which is designed in such a way that the disengaging force fluctuates very little during each and every important stage of disengagement of the pressure plate from the friction linings of the clutch disc.

A further object of the invention is to provide the friction clutch with novel and improved means for influencing the bias of the diaphragm spring upon the pressure plate.

An additional object of the invention is to provide the friction clutch with novel and improved means for limiting the extent of deformability of the diaphragm spring.

Still another object of the invention is to provide the friction clutch with a novel and improved diaphragm spring which is more versatile than the diaphragm springs of heretofore known friction clutches.

A further object of the invention is to provide the above outlined friction clutch with a novel and improved housing for the diaphragm spring and the pressure plate.

Another object of the invention is to provide a friction clutch wherein the operation of the wear compensating unit is not adversely affected by any other component parts during the entire useful life of the clutch.

An additional object of the invention is to provide a friction clutch which is assembled of a relatively small number of simple, lightweight and relatively inexpensive component parts.

Still another object of the invention is to provide a novel and improved method of operating a friction clutch which is equipped with means for compensating for wear upon the diaphragm spring, pressure plate, counterpressure plate, housing and/or the friction linings of the clutch disc.

A further object of the invention is to provide a power train which embodies a friction clutch of the above outlined character.

Another object of the invention is to provide a motor vehicle wherein the power train between the prime mover (such as a combustion engine) and the transmission (such as a manual, automated or automatic transmission) embodies a friction clutch of the above outlined character.

An additional object of the invention is to provide a friction clutch which constitutes an improvement over heretofore known friction clutches having means for compensating for wear upon the friction linings of the clutch disc and which can be installed in existing motor vehicles as a superior substitute for heretofore known friction clutches.

SUMMARY OF THE INVENTION

The invention is embodied in an engageable and disengageable friction clutch for use with a rotary clutch disc having friction linings which are subject to increasing wear in response to repeated engagement and disengagement of the clutch. The improved clutch comprises a housing which is rotatable with and relative to the clutch disc about a predetermined axis, a seat which is carried by the housing, a pressure plate which is disposed between the housing and the clutch disc and is rotatable with the housing, and a diaphragm spring which is arranged to urge the pressure plate toward the friction linings to thus engage the clutch. The pressure plate is movable axially of the housing and away from the friction linings through a distance including a first stage or portion of decreasing engagement with the friction linings and a second stage or portion of at least substantial disengagement from the friction linings. The clutch further comprises means for compensating for wear at least upon the friction linings, and such compensating means is operative between the housing and the diaphragm spring and is arranged to move the seat in the direction of the predetermined axis toward the pressure plate. The diaphragm spring is tiltable relative to the seat in a direction to disengage the clutch by effecting the aforementioned movement of the pressure plate through the aforementioned distance in response to the application to the diaphragm spring of a tilting force which is variable under the bias of a resilient component arranged to act upon the diaphragm spring in the direction of the predetermined axis and away from the pressure plate at least during a portion of the second stage of the aforementioned distance in the course of disengagement of the clutch. The compensating means is at least substantially unaffected by the bias of the resilient component in the direction of the predetermined axis and away from the pressure plate.

The housing can receive torque from a prime mover, such as the combustion engine of a motor vehicle.

The diaphragm spring has a side facing away from the housing of the clutch, and the seat can include a member which engages such side of the diaphragm spring. The clutch can further comprise resilient means for biasing the aforementioned member of the seat against the diaphragm spring. The resilient means can include at least one spring which urges the aforementioned member of the seat at least substantially in the direction of the predetermined axis and toward the housing. The wear upon the friction linings at least contributes to the determination of the useful life of the friction clutch and the resilient means is preferably arranged to apply to the diaphragm spring—in the direction of the predetermined axis and preferably during the entire useful life of the friction clutch—a force at least approximating the force required to tilt the diaphragm spring to a position which the diaphragm spring assumes after the pressure plate completes the first stage of its movement through the aforementioned distance.

The resilient component can be installed in such a way that it biases the diaphragm spring toward the housing of the friction clutch.

The resilient component can react against the housing or against the diaphragm spring to bear against the diaphragm spring or against the housing.

The resilient component can be carried by the diaphragm spring or by the housing; for example, the resilient component can be of one piece with the diaphragm spring.

The diaphragm spring can comprise an energy storing annular main portion which spacedly surrounds the predetermined axis, and projections (e.g., in the form of elongated tongues or prongs) extending from the main portion toward the predetermined axis. The resilient component can include, or can be constituted by, at least one of the projections. The clutch can further comprise means (e.g., a disengaging bearing) for tilting the diaphragm spring relative to the seat in a direction to disengage the clutch, and the aforementioned projections of the diaphragm spring can include the aforementioned at least one projection (forming part of or constituting the resilient component) and at least one additional projection which is engageable by the tilting means to tilt the diaphragm spring relative to the seat in a sense to engage or to disengage the friction clutch, particularly to disengage the clutch. The at least one projection can include a portion located at a first axial distance from the friction linings and the at least one additional projection can include a portion located at a different second axial distance from the friction linings at least in one of the engaged and disengaged conditions of the friction clutch. The portion of the at least one projection can be disposed nearer to the pressure plate than the portion of the at least one additional projection, at least in the engaged condition of the friction clutch.

The resilient component is preferably arranged to bias the diaphragm spring only in the direction toward the housing, and the compensating means can be arranged to move the seat only in the direction toward the pressure plate.

The friction clutch can further comprise means for limiting the extent of tilting of the diaphragm spring in the direction to engage or disengage the clutch, particularly in the direction to disengage the clutch. The means for limiting can comprise a stop for a portion of the diaphragm spring. For example, the means for limiting can comprise a stop in the form of a substantially annular member which is carried by the housing, and the diaphragm spring can include at least one projection (such as the aforementioned at least one additional projection in the form of a tongue or prong) which is engageable with the substantially annular member or stop in response to tilting of the diaphragm spring. The resilient component can be mounted for movement in the direction of the predetermined axis, and the means for limiting can include a stop (such as the aforementioned substantially annular member) for the resilient component. The means for limiting can further comprise means for connecting the substantially annular member to the housing, and such connecting means can comprise arms which extend at least substantially radially of the predetermined axis. The arrangement can be such that the arms are of one piece with the housing and/or with the substantially annular member of the means for limiting. The aforementioned projections of the diaphragm spring can alternate with arms of the connecting means, as seen in the circumferential direction of the substantially annular member. As already mentioned hereinabove, at least one projection of the diaphragm spring can form part of or can constitute the resilient component and at least one of the projections can abut the substantially annular member in response to tilting of the diaphragm spring relative to the seat.

The resilient component can be carried by the housing to be engageable by at least one projection of the diaphragm spring in response to tilting of the diaphragm spring relative to its seat.

The novel features which are considered as characteristic of the invention are set forth in particular in the appended claims. The improved friction clutch itself, however, both as to its construction and the mode of assembling, installing and operating the same, together with numerous additional important features and advantages thereof, will be best understood upon perusal of the following detailed description of certain presently preferred specific embodiments with reference to the accompanying drawings.

BRIEF DESCRIPTION OF THE DRAWINGS

FIG. 1 is an axial sectional view of a friction clutch and a clutch disc embodying one form of the present invention;

FIG. 4 is a fragmentary axial sectional view of a friction clutch which constitutes a first modification of the friction clutch of FIGS. 1 and 2;

DESCRIPTION OF PREFERRED EMBODIMENTS

Figure 2:
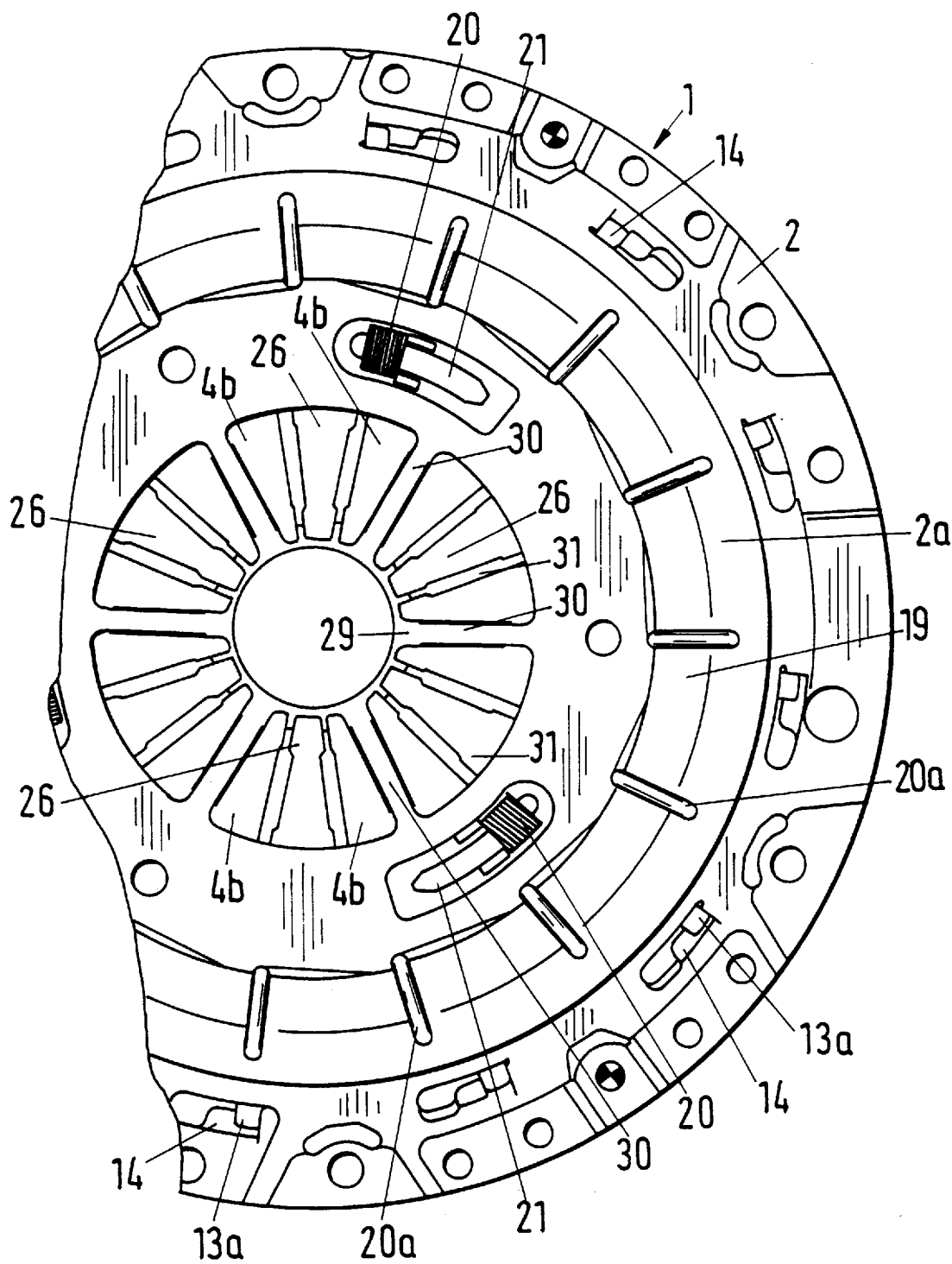
FIG. 2 is a fragmentary elevational view substantially as seen in the direction of arrow II in FIG. 1.

Referring first to FIGS. 1 and 2, there is shown a friction clutch 1 which can receive torque from a prime mover (such as the combustion engine of a motor vehicle) and serves to normally transmit torque to a coaxial clutch disc or clutch plate 8 having two friction linings 7. When the clutch 1 is engaged, one of the friction linings is in pronounced contact with the annular friction surface of a flywheel 6 which constitutes the counterpressure plate of the clutch 1 and is driven by the prime mover. The manner in which the counterpressure plate 6 can be connected to the output element of a combustion engine in a motor vehicle is fully described and shown in the aforementioned U.S. Pat. No. 5,450,934.

When the clutch 1 is engaged, the other friction lining 7 is in pronouced contact with the adjacent annular friction surface of a pressure plate 3 which receives torque from the counterpressure plate 6 by way of a clutch housing 2 and has limited freedom of movement in the direction of the common axis X of the clutch 1 and clutch disc 8. The housing 2 is or can be made of a metallic sheet material and is bolted and/or otherwise fixedly secured to the counterpressure plate 6. Leaf springs 9 are provided to couple the pressure plate 3 with the housing 2 in such a way that the pressure plate is compelled to share all angular movements of the plates 3, 6 but has limited freedom of movement in the direction of the axis X between the clutch disc 8 and the radially extending end wall 2a of the housing. A clutch spring 4, which preferably constitutes a diaphragm spring (and will hereinafter be referred to as spring or diaphragm spring) is tiltably mounted in a composite seat 5 on the housing 2 and has a circumferentially complete radially outer main portion 4a which bears against an annular projection or against an annulus of projections 3a on the pressure plate 3 when the clutch 1 is engaged; the diaphragm spring 4 then causes the pressure plate 3 and the counterpressure plate 6 to frictionally engage the respective linings 7 of the clutch disc 8 so that the hub (not shown) of the clutch disc can transmit torque to a driven part, e.g., to the input shaft of a manual, automated or automatic transmission in the power train of a motor vehicle. Reference may be had again to U.S. Pat. No. 5,450,934.

The seat 5 is an annular structure which tiltably supports the main portion 4a of the diaphragm spring radially inwardly of the projection or projections 3a of the pressure plate 3, i.e., the illustrated clutch 1 is a so-called push-type clutch because the free end portions or tips 4c of its radially inwardly extending projections 4b (in the form of prongs or tongues) must be depressed by a suitable bearing or the like, in the direction of the arrow II in order to enable or to force the pressure plate 3 to move axially of and away from the counterpressure plate 6. This enables the plates 3 and 6 to rotate relative to the friction linings 7 of the clutch disc 8 and/or vice versa.

The illustrated clutch disc 8 further comprises resilient means 10 disposed between the two friction linings 7 and designed and installed to urge the two friction linings 7 (each such friction lining can comprise a single washer-like part or a set of annularly arranged sections) axially and away from each other. The resilient means 10 ensures a gradual buildup of torque which is being transmitted by the clutch disc 8 when the pressure plate 3 is in the process of moving axially and toward the counterpressure pate 6 as well as a gradual reduction of transmitted torque when the pressure plate 3 is permitted or caused to move axially and away from the counterpressure plate 6 during disengagement of the friction clutch 1. The arrangement is preferably such that the bias of the resilient means 10 is reduced to zero (i.e., that the two friction linings 7 are caused to move to positions at a maximum axial distance from each other) before the pressure plate 3 completes its axial movement in a direction away from the counterpressure plate 6, i.e., toward the bottom wall 2a of the housing 2, so that the last portion or stage of movement of the pressure plate 3 to its retracted position (at a maximum distance from the counterpressure plate 6) can take place while the friction surface of the pressure plate is out of contact with the adjacent friction lining 7.

However, it is equally within the purview of the invention to employ a clutch disc or clutch plate which merely employs friction linings 7 (engageable by the plates 3, 6 in the engaged condition of the clutch) but does not utilize resilient means (10) for biasing the friction linings axially and away from each other. In such clutch discs, the friction linings can be more or less rigidly affixed (e.g., bonded) to a rigid carrier forming the radially outer part of the clutch disc.

The seat 5 for the main portion 4a of the diaphragm spring 4 is a composite structure including a one-piece or composite annular member 11 at that side of the diaphragm spring which faces the pressure plate 3 and a one-piece or composite member 12 at that side of the diaphragm spring which faces the bottom wall 2a of the housing 2. The member 11 of the composite seat 5 is biased against the adjacent side of the diaphragm spring 4 (i.e., in the direction of the axis X and toward the bottom wall 2a of the housing 2) by energy storing resilient means 13 which can constitute or act as a diaphragm spring. The radially outermost portion 13a of the resilient means 13 reacts against the housing 2, and this resilient means includes a set of radially inwardly extending portions 13c which are (or which can be) of one piece with the radially outermost portion 13a and have ends or tips bent in the direction of the axis X (i.e., toward the bottom wall 2a of the housing 2) to jointly constitute the member 11 of the composite seat 5. The resilient means 13 further includes a preferably circumferentially complete central portion 13b which is of one piece with the radially inwardly extending portions 13c (constituting the member 11) and with radially outwardly extending portions or arms jointly constituting the radially outermost portion 13a abutting adjacent radially inwardly extending portions or lugs 14 of the radially Router; portion of the housing 2. The resilient means 13 reacts (at 13a) against the lugs 14 of the housing 2 and bears (at 13c=11) against the left-hand side of the diaphragm spring 4 (as viewed in FIG. 1). The lugs 14 can constitute stamped out or otherwise inwardly bent portions of the sheet metal housing 2.

The means for centering the diaphragm spring 4 relative to the housing 2, and for compelling the spring 4 to share all angular movements of the housing, comprises a set of rivets 15 which are preferably equidistant from each other (as seen in the circumferential direction of the bottom wall 2a). Each such centering means or rivet 15 is anchored in the bottom wall 2a and extends (in parallelism with the axis X) through the radially outermost (preferably enlarged) portion of a slot between neighboring radially inwardly extending projections 4b of the diaphragm spring 4.

The illustrated resilient means 13 is a diaphragm spring which acts not unlike a sensor and is designed to exert upon the adjacent side of the main portion 4a of the diaphragm spring 4 a force which is constant or practically constant within a preselected distance or range, e.g., a range of at least 2 mm but not necessarily more than 5 mm (as seen in the direction of the axis X). In other words, the bias of the member 11 of the seat 5 against the adjacent side of the diaphragm spring 4 remains practically or nearly unchanged if the main portion 4a of the spring 4 is caused to move relative to the bottom wall 2a of the housing 2 through a distance of between about 2 mm and 5 mm. The bias of the sensor 13 upon the diaphragm spring 4 is superimposed upon the bias (if any) of the leaf springs 9 which are normally (or often) installed in prestressed condition so that they tend to move the pressure plate 3 (and hence the diaphragm spring 4) axially and toward the bottom wall 2a of the housing 2. Thus, the diaphragm spring 4 is being acted upon by a resultant (sensor) force furnished in part by the leaf springs 9 and in part by the resilient means or sensor 13 (it is assumed here that the springs 9 are installed in prestressed condition so that they tend to move the pressure plate 3 axially and away from the counterpressure plate 6, i.e., axially and away from the adjacent friction linings 7 of the clutch disc 8). Such resultant force opposes the force which must be applied (against the tips 4c of projections 4b forming part of the diaphragm spring 4) in the direction of arrow II in order to disengage the friction clutch 1 from the friction linings 7 of the clutch disc 8.

The annular member 12 off the aforesaid composite seat 5 is installed between the bottom wall 2a of the housing 2 and the adjacent side of the main portion 4a of the diaphragm spring 4 and is intermittently shifted in the direction of the axis X by a compensating unit 16 at a rate (i.e., through distances) necessary to account for the wear at least upon the friction linings 7 of the clutch disc 8. The compensating unit 16 acts upon the member 12 of the composite seat 5 in a direction toward the counterpressure plate 6, i.e., this unit moves the main portion 4a of the diaphragm spring 4 toward the friction linings 7 at a rate which is required to compensate at least for the wear upon the friction linings 7; however, the extent of axial displacement of the main portion 4a can be such that it accounts for the wear upon the diaphragm spring 4, upon the pressure plate 3, upon the counterpressure plate 6 and upon the friction linings 7. The compensating unit 16 can be said to react against the bottom wall 2a of the housing 2 and to act upon the member 12 of the composite seat 5 in the direction of the arrow II, i.e., in the direction of the axis X and toward the counterpressure plate 6. Such adjustment of the axial position of the main portion 4a of the diaphragm spring 4 toward the counterpressure plate 6 takes place against the opposition of the sensor 13 and the (normally prestressed) leaf springs 9. The purpose of the adjustment which is carried out by the compensating unit 16 is to prevent the development of any undesirable clearances (play) between the member 12 of the seat 5 and the bottom wall 2a of the housing 2 and/or between the member 12 and the adjacent side of the main portion 4a of the diaphragm spring 4. The absence of such clearances or play prevents the development of lost motion during actuation of the friction clutch 1 which contributes to greater efficiency, more satisfactory operation and greater ease of manipulation of the friction clutch.

The compensating unit 16 which is shown in FIGS. 1 and 2 comprises an annular member 17 one side of which is provided with a set of ramps 18 extending in a circumferential direction of the member 17 and sloping in the direction of the axis X. The member 17 of the compensating unit 16 is installed in the housing 2 in such a way that its ramps 18 confront complementary ramps 19 provided at the inner side of the bottom wall 2a. That portion of the member 17 which extends toward the pressure plate 3 constitutes or is connected to or carries the member 12 of the composite seat 5. The aforementioned rivets 15 serve to center the diaphragm spring 4 in the housing 2 as well as to center the member 17 of the compensating unit 16. The ramps 19 can be stamped out or otherwise deformed or displaced portions of the bottom wall 2a. The arrangement is preferably such that the making of the complementary ramps 19 entails the development (in the bottom wall 2a) of slots 20a which constitute air admitting passages to ensure adequate cooling of the adjacent parts of the friction clutch 1 when the latter is in actual use.

The slope and the length of the ramps 18, 19 on the annular member 17 and on the bottom wall 2a of the housing 2 are selected in such a way that the angular displacements of the member 17 (with attendant movement in the direction of the axis X toward the counterpressure plate 6) are sufficient to compensate for wear at least upon the friction linings 7 during the entire useful life of the friction clutch 1 and/or the clutch disc 8. The inclination or slope of the ramps 18 relative to a plane which is normal to the axis X can equal or approximate that of the ramps 19 and can be in the range of between about 4 and 12 degrees. Such inclination not only ensures that the unit 16 can compensate for wear at least upon the friction linings 7 during the useful life of the clutch 1 and clutch disc 8 but further ensures the establishment of a self-locking action between the two sets of ramps 18 and 19, i.e., such selection of the slope of the ramps eliminates the possibility (or at least greatly reduces the likelihood) of accidental or unintentional displacement of the member 12 of the seat 5 and of the main portion 4a of the diaphragm spring 4 toward the counterpressure plate 6. The extent of frictional engagement between the abutting surfaces of the ramps 18, 19 can be influenced by appropriate selection of the finish of such surfaces and/or by appropriate selection of the friction coefficients of their materials.

As can be best seen in FIG. 2, the annular member 17 of the compensating unit 16 is biased in a circumferential direction, namely in a direction to cause its ramps 18 to slide along the adjacent ramps 19 in a direction to move axially of and away from the bottom wall 2a of the housing 2. The means for biasing the member 17 comprises three circumferentially spaced apart coil springs 20 which react against the housing 2 and bear upon the member 17. These springs are preferably equidistant from each other, as seen in the circumferential direction of the annular member 17, and can have straight axes or arcuate axes with centers of curvature on or close to the axis X. The presently preferred number of springs 20 is three; however, it is also possible to employ fewer than three such springs or four or more springs without departing from the spirit of the invention. The illustrated coil springs 20 surround circumferentially extending lugs 21 which are of one piece with the bottom wall 2a of the housing 2, one end convolution of each such spring abuts the bottom wall 2a, and the other end convolution of each such spring abuts a substantially U-shaped (forked) portion 24 at the radially inner end of an arm 23 of the annular member 17.

The resultant (sensor) force which is furnished by the leaf springs 9 and the resilient means (sensor) 13 and acts upon the diaphragm spring 4 in the direction of the axis X counteracts the clutch disengaging force which is being applied (by a bearing or the like, see FIG. 35 of U.S. Pat. No. 5,450,934) to the tips 4c of the projections 4b in the direction of the arrow II, as well as the bias of the coil springs 20 which tend to turn the member 17 in a direction to move this member and hence the member 12 of the composite seat 5 and the main portion 4a of the diaphragm spring toward the counterpressure plate 6. Such (at least substantial) equilibrium of forces exists at least when the clutch 1 is disengaged, i.e., when the friction linings 7 are no longer contacted and rotated by the friction surfaces of the plates 3 and 6. The magnitude of the clutch disengaging force (namely of that force which is being applied to the tips 4c of the projections 4b at the diameter 4d in order to pivot the projections 4b clockwise as viewed in FIG. 1 to thus move the radially outermost part of the main portion 4a of the diaphragm spring 4 away from the counterpressure plate 6) can vary during actual tilting of the diaphragm spring by the aforementioned disengaging bearing or by any other suitable clutch disengaging means.

When the clutch disc 8 is new, i.e., when the extent of wear upon the friction linings 7 is nil or negligible, the mutual positions of the ramps 18 and of the cooperating complementary ramps 19 are such that the annular member 17 is disposed at a minimal axial distance from the bottom wall 2a of the housing 2.

In accordance with a feature of the invention, the friction clutch 1 comprises a resilient component (i.e., an elastically deformable component) which, in the embodiment of FIGS. 1 and 2, is of one piece with the diaphragm spring 4. This resilient component comprises a plurality of projections 26 in the form of tongues or prongs which extend radially inwardly from the main portion 4a of the diaphragm spring 4 and have radially inner ends or tips 26c which are axially spaced apart from the tips 4c of the projections 4b (the projections 4b can be said to form part of the clutch disengaging means) when the clutch 1 is engaged, i.e., when the diaphragm spring 4 is free to urge the pressure plate 3 against the adjacent friction linings 7 so that the friction linings are clamped between the friction surfaces and are compelled to share the rotary movements of the plates 3, 6 (or compel the plates 3, 6 to share the angular movements of the clutch disc 8 when the vehicle embodying the clutch 1 and the clutch disc 8 is coasting).

As can be seen in FIG. 2, the projections 26 can resemble or can be identical with the projections 4b. For example, the diaphragm spring 4 can comprise a resilient component composed of six equidistant projections 26, and individual projections 26 can alternate with pairs of projections 4b (as seen in the circumferential direction of the main portion 4a).

The reference character 27 denotes in FIG. 1 the axial distance between the tips 26c of the projections 26 and the tips 4c of the projections 4b (as seen in the direction of the axis X and arrow II). The distance 27 constitutes that portion or stage of the overall axial movement of the tips 4c in the direction of the arrow II which is covered by the tips 4c in order to enable the leaf springs 9 to move the friction surface of the pressure plate 3 away from the counterpressure plate 6 while the pressure plate continues to contact the adjacent friction linings 7. Such axial movement of the tips 4c toward the counterpressure plate 6 is shared by the tips 26c of the projections 26 forming part of the resilient component. When the stage 27 of axial movement of the tips 4c, 26c is completed, the tips 26c engage and are arrested by an annular member 29 of a stop which, in the embodiment of FIGS. 1 and 2, forms part of the housing 2 so that the next stage 28 of axial movement of the tips 4c takes place relative to the arrested tips 26c and is terminated when the tips 4c also engage and are arrested by the annular member 29 of the stop. The stage 28 of axial movement of the tips 4c toward the member 29 takes place while the pressure plate 3 is already disengaged from the adjacent friction linings 7 but is free or compelled to move further away from the counterpressure plate 6, e.g., under the bias of the leaf springs 9. The tips 4c may but need not come into actual contact with the annular member 29 of the stop (see the lower half of FIG. 1 which shows the tip 26c of one of the projections 26 in actual contact with the member 29 but the tip 4c of the adjacent projection 4b is slightly spaced apart from the member 29).

When the clutch 1 is disengaged, the tips 26c are located in a first plane which is normal to the axis X and is disposed at a first axial distance from the counterpressure plate 6, and the tips 4c are then located in a second plane which is also normal to the axis X and is disposed at a greater axial distance from the plate 6 than the first plane (of the tips 26c).

The conicity of the diaphragm spring 4 varies during disengagement of the clutch 1 because the main portion 4a is tilted between the members 11, 12 of the composite seat 5.

Since the overall deformability of the resilient component (including six projections 26) is less (and normally considerably less) than the overall deformability of the clutch disengaging means including the twelve projections 4b, the projections 26 undergo a deformation which is more pronounced than that of the projections 4b when the tips 26c already abut the annular member 29 of the stop but the tips 4c continue to move in the direction of the arrow II. The disengagement of the clutch 1 (provided that the friction linings 7 are still intact or practically intact) is completed when the tips 26c and 4c assume the axial positions shown in the lower half of FIG. 1.

The purpose of the resilient component including the projections 26 is to ensure that the magnitude of the disengaging force (i.e., of the force which is required to move the tips 4c from their retracted positions (as shown in the upper half of FIG. 1) all the way to their extended positions (shown in the lower half of FIG. 1) does not undergo an abrupt change (reduction) when the disengagement of the pressure plate 3 from the adjacent friction linings 7 is completed, i.e., when the stage 27 of the overall axial movement of the tips 4c toward the counterpressure plate 6 is completed. This is ensured in that, once the tips 26c abut the member 29, the projections 26 undergo deformation in response to additional tilting of the diaphragm spring 4 between the members 11, 12 of the composite seat 5 so that the projections 26 offer an increasing resistance to additional tilting of the diaphragm spring, i.e., to a movement of the pressure plate 3 away from actual contact with the adjacent friction linings 7. The projections 26 exert upon the remaining portion (4a+4b+4c) of the diaphragm spring 4 a force acting counter to the direction indicated by the arrow II, i.e., the growing bias of the projections 26 urges the remaining portion of the diaphragm spring 4 toward the bottom wall 2a of the housing 2. In other words, the projections 26 then act in unison with the resilient sensor 13 and normally in unison with the leaf springs 9.

Since the compensation for wear at least upon the friction linings 7 involves an axial movement of the seat 5 in the direction which is indicated by the arrow II, and since the progressively stressed projections 26 of the resilient component act upon the diaphragm spring 4 in a direction counter to that which is indicated by the arrow II, the operation of the compensating unit 16 (to compensate for wear at least upon the friction linings 7) is not affected (or is not appreciably or noticeably or unduly affected) by the resilient component including the projections 26.

The annular member 29 of the stop serves as a means for preventing excessive movements of the tips 4c, 26c during disengagement of the friction clutch 1. This annular member is of one piece with radially extending arms 30 alternating with those projections 4b which are adjacent each other (i.e., which are not separated from each other by discrete projections 26); the arms 30 are of one piece with the bottom wall 2a and are inclined (in the general direction of the axis X) in such a way that the bottom wall 2a and the member 29 are disposed in two axially spaced-apart planes at least substantially normal to the axis X. The median diameter of the annular member 29 is selected in such a way that it equals or approximates the diameter 4d of the circle formed by those portions of the tips 4c which are engaged and pushed by a bearing or the like (in the direction of the arrow II) during disengagement of the friction clutch 1. The plane of the annular member 29 is located between the pressure plate 3 and the diaphragm spring 4 (as seen in the direction of the axis X).

The dimensions, the configuration, the number and/or the resiliency of the projections 26 can be selected in such a way that the resilient component embodying these projections can exhibit a desired distance-to-force characteristic, i.e., a characteristic which is best suited to ensure an optimum operation (such as disengagement) of the friction clutch 1. It has been found that it is advisable to employ at least two or three equidistant projections 26 (as seen. in the circumferential direction of the circumferentially complete major portion 4a of the diaphragm spring 4). As can be seen in FIG. 2, the number of projections 26 can greatly or considerably exceed (i.e., it can be a multiple of) the preferred or acceptable minimum number (two or three).

The number of arms 30 which connect the annular member of the stop for the tips 4c and 26c with the bottom wall 2a of the housing or casing 2 may also vary within a rather wide range. For example, the connection which is shown in FIG. 2 and employs six equidistant radially extending arms 30 can be replaced with a connection including only three preferably equidistant arms or with a connection employing a total of nine preferably equidistant arms. The number of arms 30 can be selected in dependency upon the magnitude of the desired or required disengaging force and/or upon the resiliency of the projections 26. The characters 31 denote openings or windows which extend between the major portion of the bottom wall 2a and the annular member 29; these openings or windows are separated from each other by the arms 30 and each thereof provides room for the passage of one projection 26 and a pair of projections 4b. Each such projection 26 is flanked by the projections of the respective pair of projections 4b. The slots between the neighboring projections 4b of two adjacent pairs of such projections are wide enough to provide room for the respective arms 30.

The introduction of discrete projections 26 and of the respective pairs of projections 4b into the openings 31 takes place during assembly of the friction clutch 1. To this end, the inner diameter of the diaphragm spring 4 (in the unstressed condition of this spring) is greater than the maximum diameter of the annular member 29. This allows for the introduction of the six groups of projections 4b, 26 into the respective openings or windows 31 by moving such groups in the axial direction of the housing or cover 2. The diaphragm spring 4 is thereupon stressed, not later than during attachment of the housing 2 to the counterpressure plate 6 (e.g., by bolts or the like) so that the inner diameter of the stressed spring 4 is reduced and the annular member 29 is then located in the path of axial movement of the tips 4c, 26c.

The maximum possible distance (27+28) which the tips 4c of the projections 4b can cover during disengagement of a still intact friction clutch aggregate 1+8 (i.e., when the wear at least upon the friction linings 7 is still zero or near zero) must be selected in such a way that the friction clutch 1 is still operative (i.e., that the pressure plate 3 can still be fully disengaged from the adjacent friction linings 7) during each and every (including the last) period of useful life of the clutch aggregate. In fact, it is normally preferred to design the clutch aggregate 1+8 in such a way that the pressure plate 3 has some (even if very small) room to move beyond the position of actual disengagement from the adjacent friction linings 7 (toward the bottom wall 2a of the clutch housing 2) when the wear upon the friction linings has reached the maximum permissible value. Thus, the clutch aggregate 1+8 (and more particularly its wear compensating assembly including the sensor 13, the diaphragm spring 4 and the compensating unit 16) is constructed, assembled and adjusted in such a way that the axial position of the composite seat 5 is proper subsequent to completed movement of the pressure plate 3 through the distance 27+28 in the intact or practically intact condition of the clutch aggregate.

The following is a specific example of distances which can be covered by the tips 4c of the projections 4b relative to the annular member of the stop (29+30) of the housing 2 for the tips 26c and 4c: The prescribed distance to be covered by the pressure plate 3 (by full consideration of all existing and/or anticipated tolerances) is between 8.4 mm and 9 mm. On the other hand, the clutch aggregate 1+8 is assembled in such a way that the composite seat 5 assumes an improper or unsatisfactory position when it has completed a movement through a distance in excess of 13 mm (it is assumed that all of the parts which are subject to wear are still intact). The position and the design of the annular member 29 are such that, even in the event of improper operation of the clutch disengaging means (such as the aforementioned bearing), the tips 4c of the projections 4b can cover a distance 27+28=approximately 11.5 mm (again, the wear upon the friction linings 7 etc. is assumed to be nil or negligible). Once the tips 4c engage the annular member 29, the resiliency of the housing 2 permits an additional movement of the tips 4c (with the annular member 29) in the range of about 0.5 mm; such movement can take place in response to the application of somewhat excessive (greater than planned) disengaging force by way of a bearing or the like. Thus, the tips 4c of the projections 4b can cover a maximum distance (27+28+) of 11.5 mm++0.5 mm=12 mm.

It is now further assumed that the maximum permissible wear upon the friction linings 7 (as measured in the direction of the axis X) is in the range of 2.5 mm, i.e., the tips 4c of the projections 4b can still cover a distance of about 9 mm when the wear upon the friction linings reaches the maximum permissible value. In other words, once the composite seat 5 has been caused to move relative to the bottom wall 2a of the housing 2 (toward the counterpressure plate 6) through a distance of 2.5 mm (to compensate for maximum permissible wear upon the friction linings 7), the combined movement 27+28 has shrunk to about 9 mm. It will be seen that, even at such advanced (maximum permissible) stage of wear at least upon the friction linings 7, the distance is still within the prescribed range of 8.4 mm to 9 mm. In fact, there is still room for additional wear or tolerances (namely up to 0.6 mm).

The friction clutch 1 is further equipped with a device 22 which is effective at least during certain stages of the full range of rotational speeds of the clutch, to increase the axial supporting force upon the diaphragm spring 4. Such supporting force even further ensures that, even in the event of certain disturbances (departures from normal or anticipated operation) of the friction clutch 1 within one or more RPM ranges, no unnecessary or undesirable adjustments will be carried out by the compensating unit 16 due to a yielding of the resilient means (sensor) 13 for reasons other than the wear at least upon the friction linings 7. In other words, the device 22 is designed to counteract undesirable axial yielding of the resilient means 13, namely a yielding other than that which is induced by wear at least upon the friction linings 7.

The operation of the device 22 is dependent upon centrifugal force, and the illustrated device 22 comprises tongues or fingers which are of one piece with the radially outermost portion of the resilient means 13. These tongues or fingers are of one piece with the portion 13a and extend toward the bottom wall 2a of the housing 2 in substantial parallelism with the axis X. Since the illustrated resilient means 13 is a diaphragm spring, the action of the centrifugal force upon the tongues of the device 22 tends to change the conicity of this diaphragm spring which, in turn, enhances the bias of the member 11 upon the adjacent side of the diaphragm spring 4. The extent to which the action of centrifugal force can affect the bias of the resilient means 13 upon the diaphragm spring 4 can be limited by the housing 2, i.e., that portion of the housing which surrounds the tongues of the device 22 can act as a stop for such tongues to thus prevent further tilting of the resilient means (diaphragm spring) 13 under the action of increasing centrifugal force. The force which develops under the action of centrifugal force upon the device 22 is added to the force which is due to initial stressing of the resilient means 13.

The distance 28 between the tips 26c and the annular member 29 of the stop of the housing 2 is selected in such a way that, during disengagement of the friction clutch 1, the tips 26c of the projections 26 of the diaphragm spring 4 (which is being tilted during disengagement of the friction clutch) preferably reach the member 29 when the friction surface of the pressure plate 3 (which is then free to move away from the counterpressure plate 6, e.g., under the bias of the leaf springs 9) is already disengaged from (out of contact with) the adjacent friction linings 7. Otherwise stated, the tips 26c are moved into actual contact with the member 29 when the clutch 1 is at least substantially disengaged, namely when the friction linings 7 are no longer clamped between the friction surfaces of the plates 3, 6, i.e., when the plates 3, 6 no longer transmit torque (or no longer transmit any appreciable torque) to the clutch disc 8 or vice versa. At such time, the resilient means 10 no longer stores energy or does not store sufficient energy to effect additional axial movements of the two friction linings away from each other.

It is presently preferred to select the axial position of the annular member 29 in such a way that the latter is contacted by and arrests the tips 26c shortly or immediately after the friction surfaces of the plates 3, 6 become disengaged from the adjacent friction linings 7.

Once the friction clutch 1 is disengaged but the bearing continues to depress the tips 4c toward the member 29 (while the latter is already engaged by the tips 26c), the resilient component including the projections 26 acts as a means for conforming the distance-force characteristic of the clutch disengaging force to a desirable or optimum value. Thus, by appropriate selection of the configuration, dimensions, mounting and bias of the projections 26, one can "linearize" the progress of the clutch disengaging force at least during a portion of that stage of movement of the tips 4c toward the member 29 when the latter is already engaged by the tips 26c, i.e., when the plates 3, 6 are already free to rotate relative to the clutch disc 8 and/or vice versa. As used herein, the term "linearize" is intended to denote that the magnitude of the clutch disengaging force during the respective stage of movement of the tips 4c toward the member 29 remains at least substantially constant; at the very least, the magnitude of the disengaging force need not undergo any abrupt changes and can remain within a predetermined acceptable (preferably relatively narrow) range.

Figure 3:
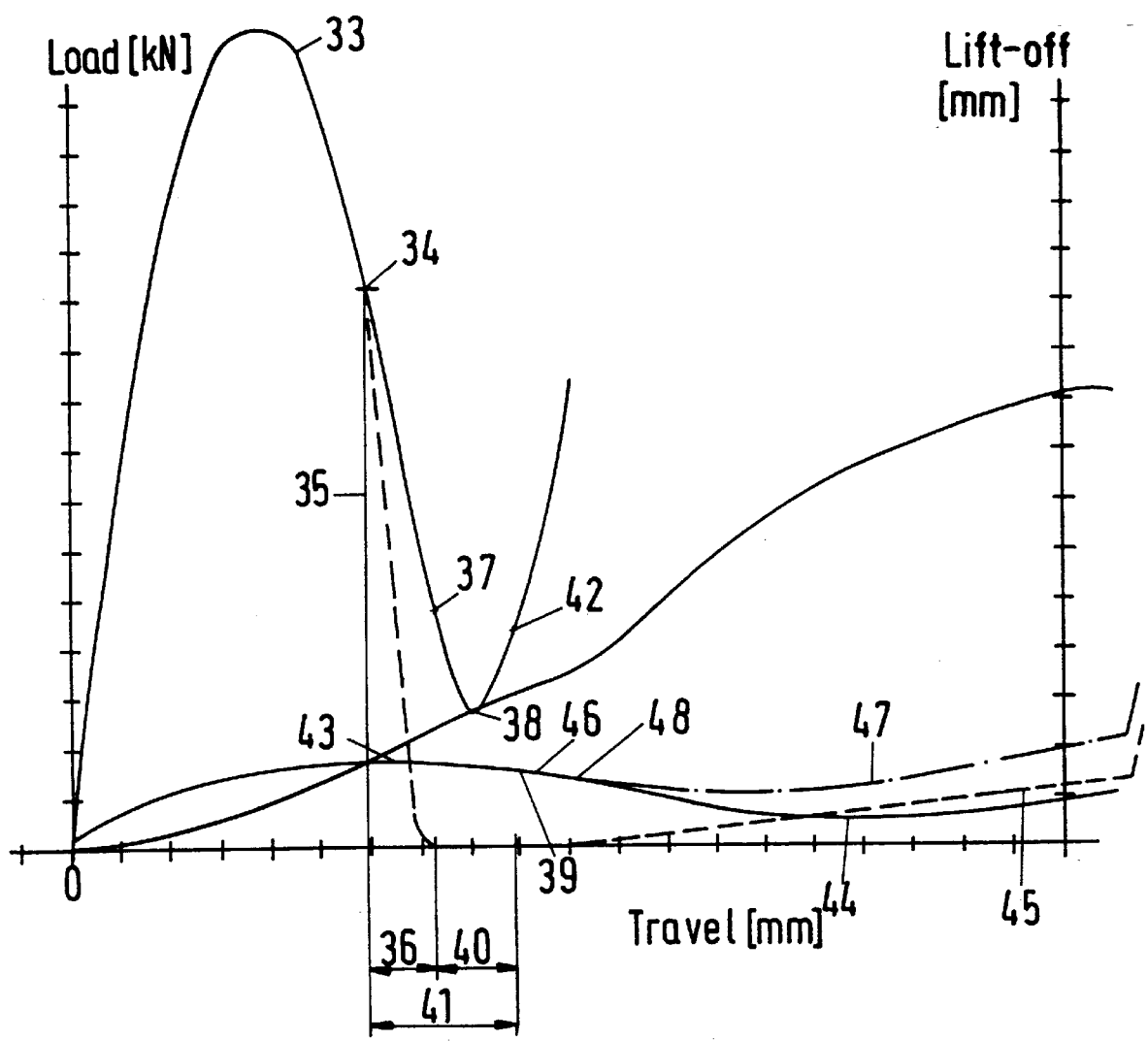
FIG. 3 is a coordinate system wherein the magnitude of the forces applied by the diaphragm spring and certain other resilient means of the friction clutch is measured along the ordinate and the distance covered by the pressure plate is measured along the abscissa.

The curves which are shown in the coordinate system of FIG. 3 are somewhat idealized for the sake of clarity and simplicity, and will be explained with reference to the following detailed description of the operation or functioning of the aggregate including the friction clutch 1 and the clutch disc 8.

The curve 33 denotes the progress of the resultant axial force during tilting (deformation) of the diaphragm spring 4 and by further taking into consideration changes of the bias of the leaf springs 9 due to movements of the pressure plate 3 relative to the counterpressure plate 6. The deformation of the diaphragm spring 4 is influenced by the radial distance between the composite seat 5 and the projection(s) 3a of the pressure plate. The extent of relative axial movement between the two abutments is measured in mm along the abscissa, and the resultant force or load in (kN) as generated by the diaphragm spring 4 and the leaf springs 9, is measured along the ordinate.

The point 34 on the curve 33 denotes the bias of the diaphragm spring 4 when the friction clutch 1 is engaged, i.e., the maximum bias of the spring 4 upon the pressure plate 3. The point 34 can be shifted along the curve 33 (upwardly or downwardly) by appropriate selection of the initial bias of the spring 4, namely by appropriate selection of the initial conicity of this spring.

The curve 35 is representative of the progress (variations) of the bias of the resilient means 10 upon the friction linings 7, namely of the progress of the variable force which the resilient means 10 can exert upon the friction linings to move them axially and away from each other, at least during the initial stage of disengagement of the friction clutch 1. In addition, the curve 35 denotes any other bias (if any) which acts in the same direction as that of the resilient means 10; such additional bias can be attributed, for example, to the resiliency of the cover or housing 2, the elasticity (if any) of the composite seat 5, the elasticity of one or more resilient components (if any) of the seat 5 and/or others.

The axial bias of the resilient means 10 upon the pressure plate 3 (by way of the respective friction linings 7) acts counter to the bias of the diaphragm spring 4 upon the pressure plate. It has been found that it is often advantageous to select the axial force which is required to effect a maximum possible axial compression of the resilient means 10 in such a way that it at least matches the bias of the diaphragm spring 4 upon the pressure plate 3 in the engaged condition of the friction clutch 1. The resilient means 10 dissipates energy during disengagement of the clutch 1 while the pressure plate 3 covers the distance 36, i.e., the distance 36 denotes the maximum extent of movability of the two friction linings 7 away from each other under the bias of the resilient means 10. In other words, the resilient means 10 assists in the disengagement of the friction clutch 1 in that it assists the force acting upon the tips 4c of the projections 4b in tilting of the diaphragm spring 4 in a sense to enable the resilient means 10 and the leaf springs 9 to move the pressure plate 3 away from the counterpressure plate 6. Thus, a relatively small disengaging force (acting upon the tips 4c of the projections 4b in the direction of the arrow II) suffices to initiate the disengagement of the clutch 1, i.e., the maximum required disengaging force is less than that which would be necessary in the absence of the resilient means 10 (it being assumed that the bias of the diaphragm spring 4 in the engaged condition of the clutch 1 is that denoted by the point 34 on the curve 33). When the disengaging force reaches and is changed beyond that denoted by the point 37 on the curve 33, the pressure plate 3 becomes disengaged from the friction linings 7 and, owing to the degressive characteristic of the corresponding portion of the characteristic curve of the diaphragm spring 4, the force which must be applied during the next stage of disengagement of the clutch 1 is much less than that which is denoted by the point 34 on the curve 33. In the absence of the resilient component including the projections 26, the disengaging force would continue to decrease to a value denoted by the point 38 on the curve 33 in FIG. 3. The curve 33 begins to slope upwardly beyond the point 38 (as considered in the direction of disengagement of the friction clutch 1).

The solid-line curve 39 denotes the progress of that clutch disengaging force which would have to be applied to the tips 4c of the projections 4b in the absence of the resilient component including the projections 26. The actual axial movement of the diaphragm spring 4 at the tips 4c departs from (is greater than) the actual axial movement of the projection(s) 3a of the pressure plate 3 to an extent which is a function of the lever arm of this diaphragm spring and of the resiliency of the projections 4b. The lever arm is determined substantially by the ratio of the radial distance between 3a and 11 to the radial distance between 4d and 11. In many or most instances, such ratio is between 3:1 and 5:1, i.e., the distance from 11 to 4d is several times the distance from 11 to 3a. The disengaging force at 4d is reduced in dependency upon the just discussed ratio in comparison with that denoted by the curve 33.

The character 40 denotes in FIG. 3 the distance which would have to be covered by the pressure plate in a direction away from actual contact with the adjacent friction linings 7 if the disengaging force were that denoted by the curve 33. The movement through the distance 40 (i.e., the overall distance 41=36+40) is completed when the disengaging force reaches the value 42 on the curve 33. As a rule, or at least in many instances, the distances 40 and 41 are selected in such a way that, at 42, the magnitude of the disengaging force is less than that denoted by the point 37 on the curve 33. This is particularly desirable and advisable if the friction clutch is not equipped with the resilient component including the projections 26 (or an equivalent resilient component) because such selection of the disengaging force (upon completion of the movement through the distance 41) prevents any undesirable adjustments by the compensating unit 16, i.e., "compensation" for non-existent wear at least upon the friction linings 7.

Due to the provision of the resilient component including the projections 26, the magnitude of the disengaging force which is being applied upon completion of disengagement (i.e., upon completed covering of the distance 41=36+40) can exceed the magnitude of that force which is denoted by the point 37 on the curve 33. This is due to the fact that the resilient component including the projections 26 can exert (either directly or indirectly) upon the diaphragm spring 4 an axial force which is parallel to and thus assists the bias of the resilient means (sensor) 13.

As can be seen by following the progress of the disengaging force which is denoted by the solid-line curve 39, i.e., of the force acting upon the tips 4c at the diameter 4d, a pronounced change of the magnitude of such force will take place (in the absence of the projections 26) when the pressure plate 3 ceases to contact the adjacent friction linings 7, namely when the stage or portion 36 of the overall distance 41 between the two extreme positions of the pressure plate is completed. In the absence of the projections 26, the disengaging force would rise to a maximum value which is shown at 43 and would drop to a minimum value shown at 44 (on the solid-line curve 39). Such rather pronounced difference between 43 and 44 is undesirable because it is particularly difficult to regulate the magnitude of the clutch engaging and disengaging forces upon the tips 4c at least during movement (distance 40) of the pressure plate 3 relative to and away from actual contact with the adjacent friction linings 7. Such problems exist regardless of whether the friction clutch is operated by a foot pedal or by a suitable motor (e.g., a servo).

The pronounced variations of the magnitude of the disengaging force within the range 40 can also be ascertained by observing that portion of the curve 33 which includes the points 37, 38 and 42. The provision of the resilient component including the projections 26 brings about a pronounced improvement at least during movement (range 40) of the pressure plate 3 away from the adjacent friction linings 7; the change of the bias of such resilient component during flexing of the projections 26 as a result of continuing advancement of the tips 4c toward the counterpressure plate 6 when the tips 26c already abut the annular member 29 is denoted by the characteristic curve 45 (indicated in FIG. 3 by a broken line). Depending upon the selection of the distance 27 and/or 28 (FIG. 1) the projections 26 can be effective (i.e., they can bias the remainder of the diaphragm spring 4) at least substantially during each portion of the movement of the tips 4c through the distance 28 (corresponding to 40 in FIG. 3) or only during a certain part of such movement of the tips 4c through the distance 28, i.e., through that distance which the pressure plate 3 is to cover in a direction toward the bottom wall 2a of the housing 2 subsequent to the termination of actual contact with the adjacent friction linings 7.

It is often desirable to design the resilient component in such a way that its projections 26 become effective at an instant when the magnitude of the disengaging force denoted by the curve 33 departs from that indicated by the point 37. The point 37 on the curve 33 corresponds to the point 46 on the curve 39. In the presence of the projections 26, the tips 4c (at the diameter 4d) are acted upon by a composite force 47 (denoted by a dot-dash line curve) including those denoted by the curves 33 and 45. The illustrated curve 47 starts at the point 48 of the curve 39; the point 48 denotes the coming of the tips 26c into contact with the annular member 29 of the stop for the tips 4c and/or 26c. The projections 26 ensure that at least subsequent to the disengagement of the pressure plate 3 from the adjacent friction linings 7, the force which is required to continue the movement of the pressure plate 3 away from the counterpressure plate 6 must be greater than in the absence of the projections 26. In addition, the projections 26 effect a desirable stabilization of the progress of that disengaging force which is required to move the pressure plate 3 away from the adjacent friction linings 7; this can be seen by observing the magnitude of the force denoted by the curve 47.

The tips 26c of all six projections 26 are assumed to engage the annular member 29 at the same time (simultaneously). However, it is also possible to select the initial (unstressed) positions of the projections 26 relative to the main portion 4a and the projections 4b of the diaphragm spring 4 in such a way that the tips 26c engage the member 29 during different stages of tilting of the spring 4 relative to the composite seat 5. This renders it possible to modulate the bias of the resilient component within a wide range, depending upon the overall number of the projections 26 and on the number of groups of projections 26 which are caused to engage the annular member 29 at the same time (the number of such groups can vary between one and n wherein n is the total number of projections 26).

Another embodiment of the improved friction clutch can employ a resilient component (which can comprise the projections 26 and/or equivalent or analogous biasing means) that is designed and installed with a view to have a characteristic curve departing from the substantially linear curve 45 shown in FIG. 3. For example, the bias of the resilient component can exhibit a progressive or a degressive character.

As concerns the exact mode of operation of the compensating unit 16, as well as additional parameters and criteria of the diaphragm spring 4, resilient means (sensor) 13, leaf springs 9 and the coil springs 20, reference may be had to the published German patent application No. 44 18 026, to the corresponding United States patent application(s), as well as to U.S. Pat. No. 5,450,934. For example, the characteristic curves of FIGS. 84, 85, 86 and 89 in the published German patent application No. 44 18 026 fully illustrate the relationship between individual springs, resilient elements and resilient components of a relevant wear compensating unit which can be utilized at 16 in the friction clutch 1 of the present invention.

The lower portion of FIG. 1 can be inspected to ascertain that the diaphragm spring 4 will be shifted toward the counterpressure plate 6 in response to increasing wear upon the friction linings 7, i.e., that the extent of deformation (bending) of the projections 26 increases in response to increasing wear at least upon the friction linings 7, i.e., during the useful life of the aggregate including the friction clutch 1 and the clutch disc 8. Such shifting of the diaphragm spring 4 is somewhat delayed or reduced due to the fact that at least some wear takes place upon the tips 26c and upon the adjacent portions of the annular member 29 during the useful life of the clutch aggregate 1+8. In addition, the extent of deformation of the projections 26 can be reduced or compensated for, if necessary, at least in part by employing resilient means having a degressive distance to-force characteristic.

The ratio between the bias of the resilient means (sensor) 13 and the disengaging force can be in the range of between 0.8 and 1.1, preferably between 0.9 and 1.

The feature that the resilient component including the projections 26 is of one piece with the diaphragm spring 4 contributes to the simplicity, compactness, convenience of assembly, and lower cost of the friction clutch 1. It is not even necessary to displace or shift the entire projections 26 relative to the projections 4b, i.e., it often suffices to shift only the tips 26c of the projections 26 axially of the diaphragm spring 4 relative to the tips 4c of the projections 4b and/or vice versa. The feature that the tips 26c are shifted axially relative to the tips 4c in a direction toward the counterpressure plate 6 is particularly important and advantageous in the so-called push-type friction clutches (the clutch 1 of FIGS. 1 and 2 is a push-type clutch) wherein the diaphragm spring (4) acts not unlike a two-armed lever which is tiltable at 5, which has a shorter arm (between 5 and 3a) and a longer arm (between 5 and 4d). The annular member 29 is engaged at least by the tips 4c when the distance 40 or 41 is excessive and/or when the friction linings 7 have undergone a maximum permissible (or close to a maximum permissible) amount of wear. As already explained above, the annular member 29 can serve as a stop for the tips 4c and/or for the tips 26c.

An important advantage of the afore described clutch aggregate 1+8 is that the resilient component (including the projections 26) which does influence the progress of the force that is necessary to actuate (engage or disengage) the clutch 1 does not exert upon the compensating unit 16 any force or forces (in the direction of the arrow II) which could or would influence the adjustment of the diaphragm spring 4 for the purpose of compensating for wear at least upon the friction linings 7. This ensures that the resilient means (sensor) 13 need not counteract the force which is being applied upon the diaphragm spring 4 by the resilient component including the projections 26 which is particularly important and advantageous for the design as well as for proper operation of the compensating unit 16.

FIG. 4 shows a portion of a modified friction clutch 101 which can operate with a clutch disc of the type shown (at 8) in FIG. 1. An important difference between the friction clutches 1 and 101 is that the latter employs a resilient component 126 which is not of one piece with the diaphragm spring 104. The illustrated resilient component 126 is a separately produced part which is secured to the diaphragm spring 104 by rivets 127 and/or in any other suitable way. The resilient component 126 can comprise a set of annularly arranged discrete projections or sections in the form of leaf springs, or it can be a one-piece annular part which is provided with several radially inwardly extending resilient projections in the form of tongues or prongs 126a corresponding to the projections 26 of the diaphragm spring 4. It is further possible to employ a membrane-like resilient component which is a washer-like body and is merely provided with substantially radially extending slots for the arms 130 of a stop further including an annular member 129. The arms 130 are of one piece with the member 129 as well as with the bottom wall 102a of the housing 102.

FIG. 4 shows the diaphragm spring 104 in a partially deformed (tilted) condition, namely in a state in which the resilient projections of the component 126 start to become effective or active. On the other hand, the pressure plate 103 is shown in an axial position which corresponds to the fully engaged condition of the friction clutch 101. Therefore, a (normally non-existent) clearance or play is shown between the radially outer portion 104b of the circumferentially complete washer-like main portion 104a of the diaphragm spring 104 and the projection(s) 103b of the pressure plate 103.

Figure 5:
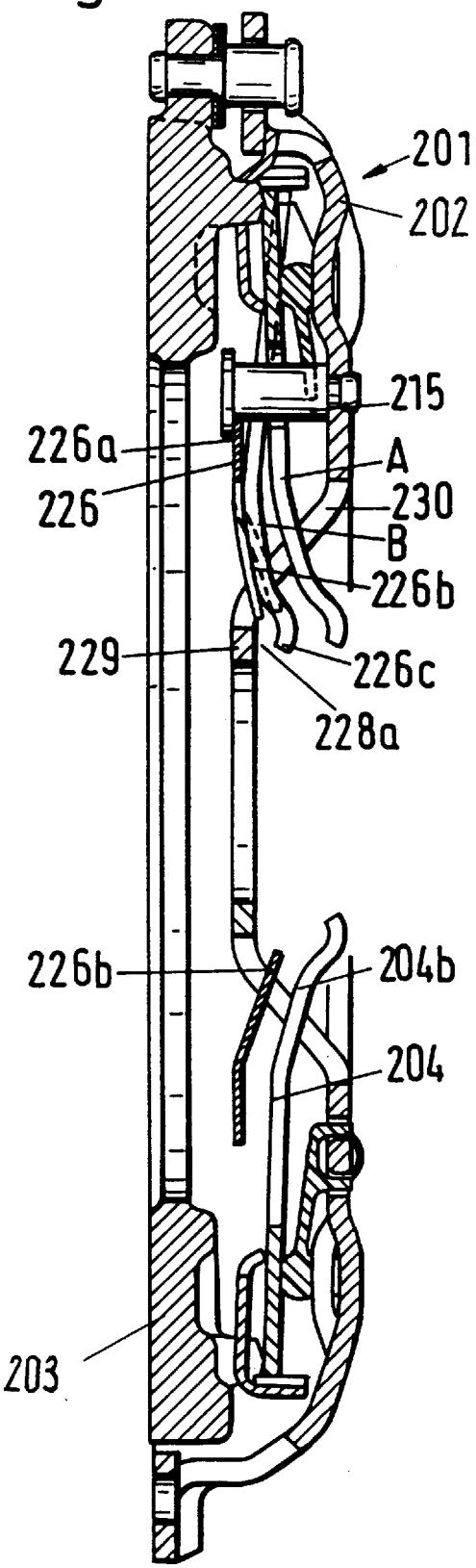
FIG. 5 is an axial sectional view of a friction clutch constituting a second modification of the friction clutch shown in FIGS. 1 and 2.

FIG. 5 shows a friction clutch 201 wherein the resilient component 226 comprises a circumferentially complete annular main portion or body 226a and projections (in the form of tongues or prongs) 226b which extend radially inwardly from the main portion 226a. When the diaphragm spring 204 is being tilted by a disengaging force to disengage the clutch 201, at least some projections (tongues or prongs) 204b of the diaphragm spring engage and displace the projections 226b so that the resilient component 226 stores energy (or additional energy) in response to further axial displacement of the projections 204b by a bearing or the like. The radially outer portion of the resilient component 226 is mounted on rivets 215 (only one shown in FIG. 5). Once at least some of the projections 226b are engaged by the respective projections 204b and the disengaging force continues to entail a tilting of the diaphragm spring 204 in a direction toward full disengagement of the friction clutch 201, the engaged projections 226b are pivoted relative to the main portion 226a so that the resilient component 226 begins to act in parallel with the diaphragm spring 204 and to influence the disengagement of the friction clutch 201.

It is possible to replace the illustrated resilient component 226 with a membrane having a circumferentially complete radially inner portion and a circumferentially complete radially outer portion, as well as substantially radially extending slits or slots or windows for the arms 230 which are of one piece with the annular member 229 and with the rear wall or bottom wall of the clutch housing or cover 202.

FIG. 5 shows the diaphragm spring 204 in two different positions including a position A in which the clutch 201 is fully engaged and a position B in which the clutch 201 (which is assumed to be new, i.e., at least practically devoid of wear) is nearly fully disengaged. The gap or clearance 228a still remaining between the tips 226c of the projections 226b and the annular member 229 of the stop (229+230) is necessary to account for wear at least upon the friction linings (not shown in FIG. 5) during the useful life of the clutch 201, i.e., for the extent of axial displacement of the diaphragm spring 204 toward the pressure plate 203 in order to account for up to maximum permissible wear upon the friction linings of the clutch disc. This ensures the establishment and maintenance of a constant (optimum) operating point during the entire useful life of the friction clutch 201.

It will be seen that, in lieu of being of one piece with or in lieu of being carried by the diaphragm spring 204, the resilient component 226 of the friction clutch 201 is mounted on the bottom wall or end wall of the housing 202 (by the rivets 215 and/or in any other suitable manner). The diaphragm spring 204 is a separately produced part and has projections 204b which engage (some or all of) the projections 226b of the resilient component 226 upon completion of a certain initial tilting movement of the diaphragm spring 204 in a direction to disengage the clutch 201. The resilient component 226 may but need not be mounted in a pre-stressed condition, i.e., the stressing can begin only upon completion of a certain axial movement of the tips of the projections 204b toward the pressure plate 203.

Figure 6:
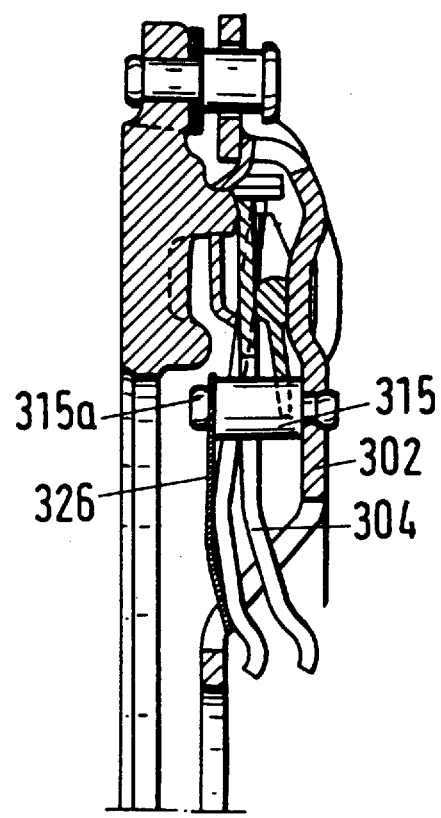
FIG. 6 is a fragmentary axial sectional view of a further friction clutch.

FIG. 6 shows a portion of a friction clutch which differs from the friction clutch 201 of FIG. 5 in that the resilient component(s) 326 is or are mounted in the housing 302 in a different way. The illustrated resilient component 326 includes a radially outer portion with openings or slots for the shanks 315a of the rivets 315 (only one shown). The manner in which the components 226, 326 cooperate with the respective diaphragm springs 204, 304 is basically the same as that of cooperation between the projections 26 and the diaphragm spring 4 in the friction clutch 1 of FIGS. 1 and 2. The difference is that, by utilizing resilient components 226, 326 which constitute or act not unlike diaphragm springs or membranes, one can achieve a non-linear force-to-distance relationship which is superimposed upon the progress of the disengaging force serving to tilt the diaphragm spring 204 or 304.

Referring again to FIG. 1, there is shown (by phantom lines) a portion of a resilient component 426 which can be utilized in addition to or in lieu of the resilient component including the projections 26. If the component 426 is used in addition to the diaphragm spring 4, the projections 26 need not be displaced relative to the projections 4b, i.e., the diaphragm spring 4 can comprise a total of eighteen projections 4b having tips 4c all of which engage the annular member 29 at the same time. The resilient component 426 of FIG. 1 is a diaphragm spring or a membrane which is centered by the annular member 29 relative to the housing or cover 2 and is engaged by the tips 4c of the projections 4b upon completion of a certain initial stage of disengagement of the friction clutch 1. The next stage of axial displacement of the tips 4c toward the counterpressure plate 6 brings about a progressing elastic deformation of the resilient component 426 which thus opposes the bias of the diaphragm spring 4.

An important advantage of the improved clutch aggregate is that the additional disengaging force which is required to cause the resilient component (26, 126, 226, 326 or 426) to store energy or additional energy does not exert any unfavorable or deleterious influence upon the operation of the compensating unit 16 or an equivalent wear compensating unit because the force or bias generated by the resilient component acts upon the diaphragm spring 4, 104, 204 or 304 counter to the direction which is indicated by the arrow II of FIG. 1, i.e., the resilient component acts in the same direction as the sensor (such as 13) and the leaf springs (such as 9). Therefore, the designer of the improved friction clutch has much room for the selection of the force-to-distance progress or characteristics of the novel resilient component. For example, and as already described hereinbefore, the maximum disengaging force which is being applied subsequent to actual disengagement of the pressure plate from the adjacent friction linings can exceed the bias of the sensor (such as 13) and/or of the leaf springs (such as 9) upon the diaphragm spring (such as 4). In other words, at least after the pressure plate is already disengaged from the adjacent friction linings, the resilient component can exert a force which assists the bias of the leaf springs and/or of the sensor.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of friction clutches and, therefore, such adaptations should and are intended to be comprehended within the meaning and range of equivalence of the appended claims.

What is claimed is:

1. An engageable and disengageable friction clutch for use with a rotary clutch disc having friction linings subject to increasing wear in response to repeated engagement and disengagement of the clutch, comprising a housing rotatable with and relative to said clutch disc about a predetermined axis; a seat carried by said housing; a pressure plate disposed between said housing and said clutch disc and rotatable with said housing; a diaphragm spring arranged to urge said pressure plate toward said friction linings to thus engage the clutch, said pressure plate being movable axially of said housing and away from said friction linings through a distance including a first stage of decreasing engagement with said friction linings and a second stage of at least substantial disengagement from said friction linings; and means for compensating for wear at least upon said friction linings, said compensating means being operative between said housing and said spring and being arranged to move said seat in the direction of said axis toward said pressure plate, said spring being tiltable relative to said seat in a direction to disengage the clutch by effecting said movement of said pressure plate through said distance in response to the application upon said spring of a tilting force which is variable under the bias of a resilient component arranged to act upon said spring in the direction of said axis and away from said pressure plate at least during a portion of said second stage in the course of disengagement of the clutch, said compensating means being at least substantially unaffected by the bias of said resilient component in the direction of said axis and away from said pressure plate.

2. The clutch of claim 1, wherein said housing is arranged to receive torque from a prime mover of a motor vehicle.

3. The clutch of claim 1, wherein said spring has a side facing away from said housing and said seat includes a member engaging said side of said spring, and further comprising resilient means for biasing said member against said spring.

4. The clutch of claim 3, wherein said resilient means includes at least one spring which urges said member of said seat at least substantially in the direction of said axis toward said housing.

5. The clutch of claim 3, wherein the wear upon said friction linings at least contributes to a determination of useful life of the clutch and said resilient means is arranged to apply to said spring, in the direction of said axis and during said useful life, a force at least approximating the force required to tilt said spring to a position which the spring assumes after said pressure plate completes said first stage of movement.

6. The clutch of claim 1, wherein said resilient component biases said spring toward said housing.

7. The clutch of claim 1, wherein said resilient component is arranged to react against one of said housing and said spring and to bear against the other of said housing and said spring.

8. The clutch of claim 1, wherein said resilient component is borne by said spring.

9. The clutch of claim 1, wherein said resilient component is borne by said housing.

10. The clutch of claim 1, wherein said resilient component is of one piece with said spring.

11. The clutch of claim 1, wherein said spring comprises an energy storing annular main portion spacedly surrounding said axis and projections extending from said main portion toward said axis, said resilient component including at least one of said projections.

12. The clutch of claim 11, further comprising means for tilting said spring relative to said seat in a direction to disengage the clutch, said projections including said at least one projection and at least one additional projection engageable by said tilting means.

13. The clutch of claim 12, wherein said at least one projection includes a portion located at a first axial distance from said friction linings and said at least one additional projection includes a portion located at a different second axial distance from said friction linings at least in one of the engaged and disengaged conditions of the clutch.

14. The clutch of claim 13, wherein said portion of said at least one projection is nearer to said pressure plate than said portion of said at least one additional projection in the engaged condition of the clutch.

15. The clutch of claim 1, further comprising means for limiting the extent of tilting of said spring in the direction to disengage the clutch.

16. The clutch of claim 15, wherein said means for limiting comprises a stop for a portion of said spring.

17. The clutch of claim 15, wherein said means for limiting comprises a substantially annular member carried by said housing and said spring includes at least one projection engageable with said substantially annular member in response to tilting of the spring relative to said seat.

18. The clutch of claim 15, wherein said resilient component is movable in the direction of said axis and said means for limiting includes a stop for said resilient component.

19. The clutch of claim 1, wherein said resilient component is arranged to bias said spring only in the direction toward said housing and said compensating means is arranged to move said seat only in the direction toward said pressure plate.

20. The clutch of claim 1, wherein said spring includes at least one projection and said resilient component is borne by said housing and is engaged by said at least one projection in response to tilting of said spring relative to said seat.

21. The clutch of claim 1, further comprising means for limiting the extent of tilting of said spring in the direction to disengage the clutch, said means for limiting comprising a substantially annular member engageable by said spring and means for connecting said substantially annular member to said housing.

22. The clutch of claim 21, wherein said connecting means comprises arms extending substantially radially of said axis.

23. The clutch of claim 21, wherein at least one of said substantially annular member and said connecting means is of one piece with said housing.

24. The clutch of claim 21, wherein said connecting means comprises arms extending substantially radially of said axis, said spring including projections alternating with said arms as seen in a circumferential direction of said substantially annular member.

25. The clutch of claim 24, wherein at least one of said projections forms part of said resilient component.

26. The clutch of claim 24, wherein at least one of said projections is arranged to abut said substantially annular member in response to tilting of said spring.

* * * * *